United States Patent Office 3,445,380

Patented May 20, 1969

3,445,380

TREATING SOUR HYDROCARBON DISTILLATES CONTAINING MERCAPTO COMPOUNDS AND ACIDIC, SURFACE-ACTIVE MATERIALS

Peter Urban, Northbrook, Ill., assignor to Universal Oil Products Company, Des Plaines, Ill., a corporation of Delaware No Drawing. Filed July 7, 1967, Ser. No. 651,657
Int. Cl. C10g 21/08, 19/02
U.S. Cl. 208—206 10 Claims

ABSTRACT OF THE DISCLOSURE

A sour hydrocarbon distillate containing mercapto compounds and acidic, surface-active materials is treated by (a) contacting the distillate with finely divided, solid NaOH or KOH, (b) separating the distillate which now contains alkali metal salts of the acidic, surface-active materials, (c) washing the distillate with an aqueous solution containing a detergent, such as a salt of an alkyl aryl sulfonate and (d) contacting the washed distillate with an oxidizing agent and a phthalocyanine catalyst in an alkaline solution to recover a distillate substantially reduced in mercapto compounds. The pretreatment steps with solid alkali metal hydroxide and the aqueous detergent wash eliminate acidic, surface-active materials, e.g. metallic naphthenates and phenolates, which have a deleterious effect on the phthalocyanine catalyst.

The subject of the present invention is an improvement in a phthalocyanine-catalyzed process for the oxidation of mercapto compounds contained in a sour hydrocarbon distillate (referred to herein as a "sweetening process"). The concept of the present invention resulted from my recognition that certain acidic, surface-active materials, originally present in the sour distillate, accumulated in an alkaline solution and on a phthalocyanine catalyst utilized in the process with resultant deactivation of the catalyst. Coupled with this observation, was my discovery that these deleterious, surface-active materials are removed by contacting the sour hydrocarbon distillate with finely divided solid alkali metal hydroxide and washing the contacted distillate with a detergent-containing aqueous solution. Therefore, the present invention comprises a combination process involving a solid alkali treating step, an aqueous washing step, and a mercapto compound oxidation step. Taken together, these steps result in an improved sweetening process having greater catalyst stability and allowing more efficient utilization of the alkaline solution employed therein.

A widely used process for the oxidation of mercapto compounds (i.e. mercaptans, thiophenols, and salts thereof) utilizes a phthalocyanine catalyst. In most cases this catalyst is found to be very effective and extremely stable —especially in the oxidation of comparatively low molecular weight mercapto compounds and those of primary and secondary configurations. Some difficulty is, however, experienced when this catalyst is used for the treatment of sour distillates containing high molecular weight mercapto compounds, tertiary mercapto compounds, and poly-functional mercapto compounds. Recently, it has been determined that this difficulty is, at least in part, due to the concomitant presence of acidic, surface-active, catalyst-poisoning materials in these sour distillates. These surface-active materials are, in the main, higher molecular weight aliphatic and naphthenic acids and phenolic materials. Typical of the toxin-acting acids are: aliphatic acids such as lauric acid, tridecanoic acid, myristic acid, etc., and naphthenic acids such as cyclohexanecarboxylic acid, 1,2-cyclohexanedicarboxylic acid, etc. Representative of the phenolic materials are: phenols, the alkyl and polyalkyl phenols, the aminophenols, the phenolsulfonic acids, the naphthols, etc.

Based on extensive laboratory investigation, it appears that, in the presence of an alkaline reagent, these acidic surface-active materials (or salts thereof) are attracted to the surface of the phthalocyanine catalyst where they constitute a barrier to the approach of mercaptide anions, which is believed to be an essential step in the chemistry of the over-all oxidation reaction. In addition, these surface-active materials interfere with the formation of the mercaptide anions—apparently, by collecting at the interface between the hydrocarbon phase and the alkaline phase in the conversion zone.

The deleterious effect of these acidic, surface-active materials tends to be particularly acute when the alkaline solution used in the conversion zone is continuously recycled for further use in the process. For higher-boiling sour hydrocarbon streams, this alkaline solution typically contains a mercapto compound solubility-increasing agent such as an alcohol, and the economics of the resultant process make it imperative that at least a part of this alkali-alcohol solution be recycled. In view of the necessity of recycling, it is apparent that even the sweetening of hydrocarbon distillates having a relatively low concentration of surface-active materials can result in substantial catalyst deactivation due to the accumulation of these materials in the alkaline solution utilized in the process.

Even in a sweetening process where the alkaline solution is not continuously recycled, these acidic surface-active materials cause serious problems. For instance, a popular embodiment of this phthalocyanine-catalyzed sweetening process utilizes, in a conversion zone, a fixed bed of a composite of a metallic phthalocyanine with an activated carbon material. In this case the alkaline solution is typically only periodically injected into the conversion zone in order to maintain a desired level of alkalinity in the catalyst bed; nevertheless deactivation of the catalyst is observed when the feed to the conversion zone contains these acidic, surface-active materials. Evidently, this deactivation is primarily a result of the adsorption of the salts of these materials (e.g. metallic naphthenates and phenolates) on the bed. These salts appear to have a cumulative affect on the activity of the catalyst. Moreover, because of the strong affinity of these materials for the catalytic bed, extraordinary procedures are usually necessary in order to regenerate these catalytic beds. For example, expensive alcohol washes and reimpregnation procedures are often employed to reactivate the catalyst.

Regardless of the exact mechanism by which these surface-active materials interfere with the desired mercapto compound oxidation reaction, I have now found that the interference can be substantially eliminated by a pretreatment procedure with a finely divided solid alkali metal hydroxide coupled with a wash with a detergent-containing solution as will be discussed hereinafter in detail.

It is, accordingly, an object of the present invention to improve the stability of a phthalocyanine catalyst employed in sweetening service. Another object is to provide a method for removal of acidic, surface-active materials from a sour hydrocarbon distillate. Yet another object is to provide a sweetening process employing a composite of a metallic phthalocyanine and an activated carbon material that does not require complex regeneration procedures. Still another object is to provide a combination process for the preparation of a hydrocarbon distillate that is substantially free of mercapto compounds and of acidic surface-active materials.

In a broad embodiment the present invention comprehends a process for treating a sour hydrocarbon distillate containing mercapto compounds and acidic, surface-active materials. The process includes the steps of: (a) contacting the sour hydrocarbon distillate with finely divided solid alkali metal hydroxide to form salts of the acidic, surface-active materials; (b) separating solid alkali metal hydroxide from the resulting mixture to obtain a hydrocarbon distillate containing salts of the acidic, surface-active materials; (c) washing the salt-containing distillate with an aqueous solution containing a water-soluble detergent to remove the salts of the acidic, surface-active materials; (d) contacting the washed distillate and an oxidizing agent with a phthalocyanine catalyst in the presence of an alkaline solution at conditions effecting oxidation of mercapto compounds; and (e) recovering from the products of step (d), a hydrocarbon distillate substantially reduced in mercapto compound content.

Other embodiments and objects of the present invention encompass: various kinds of sour hydrocarbon distillates that can be treated thereby; various types of solid alkali metal hydroxides, washing solutions, alkaline solutions, oxidizing agents, and phthalocyanine catalyst, that can be used therein; typical process conditions and procedures governing each step thereof; and the like. These are all hereinafter disclosed in the detailed discussion of each of these facets of the present invention.

The improved process of the present invention is especially advantageously used in the oxidation treatment of heavier hydrocarbon distillates containing mercapto compounds, including particularly kerosines and jet fuels. Other heavy hydrocarbon distillates include solvent oils, diesel fuels, fuel oils, lubricating oils, etc. These heavier hydrocarbon oils generally contain intractable mercapto compounds and significant quantities of acidic surface-active impurities and are, thus, particularly suited for treatment thereby. While the present process is particularly applicable to the oxidation treatment of these heavier hydrocarbon distillates, it is understood that the process also may be used for the oxidation treatment of other mercapto compound-containing streams including: concentrated mercapto fractions, sour gasolines, sour naphthas, and the like—provided, of course, that these streams also contain acidic surface-active materials. The special applicability of the present invention to heavier hydrocarbon distillates (i.e. boiling above the gasoline range) is primarily a consequence of the almost inevitable presence of deleterious acidic, surface-active materials in these streams—particularly naphthenic acids and phenolic materials. For example, excellent results are obtained when processing kerosine distillates as will be shown in the examples appended to this discussion.

According to the present invention, the initial step in the combined process involves contacting the sour distillate with a finely divided solid alkali metal hydroxide. Although in theory any solid alkali metal hydroxide could be employed in the present invention, in actual practice, either sodium hydroxide or potassium hydroxide or a mixture of these is preferred primarily because of their ready availability and relatively modest cost. These are preferably prepared by pulverizing solid particles that are typically obtained from commercial sources. Despite the teachings of the prior art in this area (e.g. see U.S. Patent No. 2,311,593 issued to V. A. Kalicheusky) that the size of the particles is a critical parameter, I have found for my purpose of removing acidic surface-active materials, that the exact size of the particles is not controlling. And so long as they are small enough to provide intimate contact between the distillate and the particles, significant results are obtained. Thus I have obtained useful results merely by pulverizing solid caustic to 50 to 100 Tyler mesh size with a pestle and mortar or by using a commercial roller mill. However, any of the methods mentioned in U.S. Patent No. 2,311,593 can be employed to prepare the finely divided solid alkali metal hydroxide if desired.

The amount of solid alkali metal hydroxide used per unit of distillate is a complex function of the nature of the surface-active materials in the distillate, the distribution of particle sizes in the finely divided solid alkali, the method of contacting employed, etc. Considering all of these factors, I have determined that it is preferable to operate with a large excess of solid alkali over that which would be stoichiometrically required to react with the surface-active materials in the distillate—that is to say, about 100% to about 1000% or more by weight of the stoichiometric amount necessary to neutralize the acidic materials present (excluding weakly acidic substances such as mercapto compounds).

In general, the method of contacting the solid alkali with the distillate is not of critical importance. In one method, the sour distillate and the finely divided alkali metal hydroxide are placed in a container provided with a suitable agitation mechanism and the treating step is carried out in a batch-type operation. In another method, the finely divided alkali is passed to the top of a treating column and countercurrently contacted with an ascending stream of the sour distillate. In yet another method, the finely divided alkali metal hydroxide can be suspended or entrained in a portion of the distillate to be treated or in a suitable organic liquid that is readily separatable from the treated distillate, and the resultant slurry contacted with the distillate to be treated in a suitable contacting zone. Other methods involve possible combinations and permutations of the above methods, as will be readily recognized by those skilled in the art. It is also to be noted that the scope of the present invention includes multiple solid alkali treating steps, which may be advantageously employed in some instances.

The process conditions utilized in the solid alkali treating step are not of critical significance with the possible exception of contact time. Ordinarily, a time of contact will be employed which is sufficient to form salts of the acidic surface-active materials contained in the distillate to be treated. In general, one convenient method for determining the contact time is with reference to the acid number of the treated distillate. As is well known, the acid number refers to the number of milligrams of potassium hydroxide neutralized by the acidic material in one gram of oil. For a particular distillate, the contact time can be conveniently selected by plotting the acid number of the treated distillate versus contact time. Since the decrease in acid number generally corresponds to the decrease in the more acidic, surface-active materials (i.e. fatty acids and naphthenic acids), the point of the aforementioned curve where the slope of the curve approaches zero is approximately the point of disappearance of the more acidic, surface-active materials, and the selection of a contact time as a function of this basic time interval gives excellent results. Alternatively, the contact time can be selected on the basis of a series of simple experiments, familiar to those skilled in the art, with the combination process of the present invention, directed toward the acquisition, for a particular distillate, of the relationship between the activity of the phthalocyanine catalyst and the contact time employed in the solid alkali treating step.

Regardless of which method is used in the solid alkali treating step, a sour distillate product is obtained which contains significant quantities of suspended or entrained solid alkali. It is, therefore, necessary to separate this material from the treated distillate. This is conveniently accomplished by any of the well-known methods of separating solid particles from a fluid, such as settling, centrifuging, filtering and the like. The preferred method is filtering. After this separation step is performed, a salt-containing hydrocarbon distillate is obtained which is free of solid alkali.

The effluent from this separating step is then subjected to a washing step in order to remove the salts of the acidic, surface-active material therefrom. Although any suitable procedure for removing polar molecules from a liquid can be used in the present invention, it is preferred that an aqueous wash be employed. In particular, excellent results are obtained with an aqueous washing solution containing a water-soluble detergent. Examples of detergents which may be employed include alkyl aryl sulfonates and salts thereof such as the sodium salt of dodecylbenzene sulfonate, the diamyl ester of sulfosuccinic acid, sulfated fatty acid esters, sodium tetrahydronaphthalene sulfonate, $C_{12}$ to $C_{16}$ alkyl sulfates, oleyl sodium methyl taurate, monobutyl phenyl phenol sodium monosulfonate, glycerol monostearate, alkyl polyoxyethylene alcohols, dodecyl toluene sodium sulfonate, dodecyl xylene potassium sulfonate, and the like detergents. In particular, a preferred group of detergents is selected from the class characterized as polyoxyethylene derivatives of fatty acid partial esters of hexitol anhydrides. These detergents are preferably used in an amount of about 0.01% to about 10% by weight of the aqueous washing solutions, with about 0.1% to about 5.0% giving excellent results.

Depending on the nature and concentration of the salts of the acidic, surface-active materials contained in the distillate to be washed, the quantity of the aqueous washing solution used per unit of distillate, can be selected from a wide range. The objective of this washing procedure is to achieve intimate contact between the two phases and transference of the salts of the acidic, surface-active materials to the aqueous phase—the detergent, in effect, acting as a scavenger agent. Ordinarily, a volumetric ratio of aqueous solution to treated distillate of about 0.05% to about 10.0% gives good results, although a higher ratio can be utilized if desired.

Regarding the method of washing utilized in the washing step, it can be either batch or continuous. In one method, the salt-containing hydrocarbon distillate is introduced into the lower portion of a washing zone and passes upwardly therethrough in countercurrent contact with a descending stream of the aqueous washing solution introduced in the upper portion of the zone. In another method, the salt-containing distillate is passed through a body of aqueous washing solution disposed in a washing zone. Regardless of which method is used it is understood that the washing zone may include suitable mixing devices such as rotating blades, stirrers, etc., in order to facilitate contact between the distillate and an aqueous treating solution. Likewise, in some situations, the washing zone may contain internal means for effecting intimate contact between the two liquids such as perforated plates, bubble-cap plates, Raschig rings, etc. In most cases, the washed distillate will contain a haze of entrained or suspended particles of the washing fluid. However, this haze will in general quickly settle out of the distillate, or can quite easily be removed by adsorption with a suitable adsorbent material. In either event, a substantially surface-active material-free distillate is readily obtained from the washing step of the present invention.

Turning now to the sweetening step of the present invention, it is evident from the previous discussion that it involves contacting the washed distillate, obtained as hereinabove set forth, an alkaline solution, and an oxidizing agent with a phthalocyanine catalyst at conditions effecting oxidation of mercapto compounds. This sweetening step is performed with a phthalocyanine catalyst not only because of its marked efficiency and convenience but also because of the hereinbefore mentioned improvement which the pretreatment steps of the present invention effects on a sweetening process using this catalyst.

Any suitable phthalocyanine catalyst may be used in the sweetening step and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. These metal phthalocyanines, in general, are not readily soluble in aqueous solvents, and, therefore, for use in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt vanadium phthalocyanine with 25–50% fuming sulfuric acid. While the sulfonic acid derivative is preferred, it is understood that other suitable polar derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

This phthalocyanine catalyst may be utilized either as a suspension or solution in a suitable alkaline solution or as a fixed bed in a conversion zone. When used as a solution, the catalyst is preferably used in amounts below about 1% by weight of the alkaline solution. Excellent results have been obtained using about 5 p.p.m. to about 1000 p.p.m. based on the weight of the alkaline solution.

In a preferred embodiment the catalyst is employed as a fixed bed in the conversion zone and, accordingly, the catalyst is prepared as a composite with a solid support. Any suitable support may be employed and preferably comprises activated charcoal, coke or other suitable forms of carbon. In some cases, the support may comprise silica, alumina, magnesia, etc., or mixtures thereof. The solid catalyst is prepared in any suitable manner. In one method, preformed particles of the solid support are soaked in a solution containing the phthalocyanine catalyst, after which excess solution is drained off and the catalyst is used as such, or is subjected to a drying treatment such as mild heating, blowing with air, hydrogen, nitrogen, etc., or successive treatments using two or more of these treatments prior to use in the oxidation. In other methods of preparing the solid composite, a solution of the phthalocyannine catalyst may be sprayed or poured over the particles of the solid support, or such particles may be dipped, suspended, immersed or otherwise contacted with the catalyst solution. The concentration of phthalocyanine catalyst in the composite may range from 0.05% to 10% by weight or more of the composite, with a preferred value of about .01% to about 1.0%.

According to the present invention, the sweetening is effected in the presence of an alkaline solution. A preferred alkaline reagent comprises sodium hydroxide or potassium hydroxide. Other alkaline solutions include lithium hydroxide, rubidium hydroxide, cesium hydroxide, etc., although in general, these hydroxides are more expensive and therefore are not preferred for commercial use. Preferred alkaline solutions are about 1% to about 50%, and more particularly about 5% to about 25%, by weight concentration of sodium hydroxide or potassium hydroxide preferably in water, or any other suitable solvent.

In some instances, an alkaline solution may be employed which contains one or more mercapto compound solubility-increasing agents in addition to the alkali metal hydroxide and the solvent. Typical of these agents are methanol, ethanol, propanol, diamino alcohols, glycols, dimethylsulfoxide, various aliphatic amines, and the like.

Depending upon the nature and concentration of the mercapto compounds contained in the treated sour hydrocarbon distillate, the ratio of the volume of the alkaline solution to the volume of the sour distillate can be selected from a wide range. The objective is to achieve intimate contact between the two phases and transference of the mercapto compound from the oil phase to the alkali phase. Ordinarily, a volumetric ratio of about 0.005 to about 1.0 gives good results, although a higher ratio can be utilized if desired. In a preferred embodiment of the present invention in which the catalyst is a composite of phthalocyanine with a solid support, the alkaline solution may be employed first to saturate the catalytic material, and thereafter only periodically injected to restore the desired level of alkalinity in the bed of catalyst; however, the integrated amount of alkaline solution utilized over a representative time period will still be within the above range.

As hereinbefore set forth, sweetening of the treated sour hydrocarbon distillate is effected by oxidation of mercapto compounds. Accordingly, an oxidizing agent is used in the process. Oxygen is particularly preferred. Air or other oxygen containing gases may be advantageously used. Although not preferred, iodine, ferric chloride, lead peroxide, hydrogen peroxide, and other well-known oxidizing agents may in some cases be utilized to effect the desired oxidation. Oxygen is preferably utilized in at least the stoichiometric amount necessary to oxidize the mercapto compounds.

Oxidation of the mercapto compounds in the treated hydrocarbon distillate is effected in any suitable manner. In general, the oxidation is effected at temperatures of ambient to about 200° F. when operating at atmospheric pressure, or when desired, a higher temperature which ranges up to about 400° F. or more when operating at superatmospheric pressure. Atmospheric or superatmospheric pressure which may range up to about 1000 pounds or more may be utilized; however, it is preferred to utilize a pressure which insures that sufficient oxygen is dissolved in the hydrocarbon distillate being treated and this generally encompasses a pressure of about 50 p.s.i.g. to about 150 p.s.i.g.

The time of contact between the reactants with the catalyst in the conversion zone can generally be adjusted to produce the desired level of mercapto compound oxidation and may range within wide limits depending on the nature and concentration of mercapto compounds, the viscosity and temperature of the sour distillate, the accumulated life of the catalyst, and the like. In general, this is not a critical parameter and may be selected from a wide range of about minutes to one hour or more with a preferred value of about 5 to about 30 minutes.

Additional details as to the sweetening step of the process of the present invention are given in U.S. Patent No. 2,988,500 and 3,108,801.

In a preferred embodiment, the catalyst is disposed as a fixed bed in a conversion zone and the sour hydrocarbon distillate, oxygen, and the alkaline solution are passed, at the desired temperature and pressure into contact with the catalyst in either upward, downward, or radial flow. In another embodiment the sweetening may be performed in a batch style operation. In either instance the reaction mixture from the contacting zone is passed into a separating zone. Here excess air is vented and a treated hydrocarbon distillate substantially reduced in mercapto compound content is recovered.

The following examples are introduced to illustrate further the novelty, utility, and mode of operation of the present invention but not with the intention of unduly restricting the present invention.

EXAMPLE I

In order to demonstrate the marked improvement in sweetening ability that characterizes the present invention, a two part comparison test was made—the first part was a control run and the second part was made according to the present invention. The sour hydrocarbon distillate utilized in both parts of the test was a commercial kerosine having a boiling point range of 297° F. to 506° F., a mercapto sulfur content of 720 p.p.m., a 41.8° API gravity at 60° F., an acid oil number of 0.03 and 250 p.p.m. of phenols by ultraviolet analysis.

In both parts of the test 300 cc. of the kerosine and 300 cc. of an 8% by weight sodium hydroxide solution containing 100 p.p.m. of cobalt phthalocyanine disulfonate were placed in a high speed mixing device. The device was maintained at 40° C. and excess air was continuously supplied thereto. After stirring the contents for 30 minutes the hydrocarbon phase was decanted and its residual mercapto content measured. The decanted hydrocarbon phase was then replaced by 300 cc. of fresh fuel and the process repeated in the same fashion outlined above. Each part of the test consisted of 3 cycles through the oxidation procedure.

In the first part of the test, which was the control part, the sour kerosine without any pretreatment was utilized. The mercapto sulfur content at the end of each cycle were: 53 p.p.m. for cycle 1, 79 p.p.m. for cycle 2, and 88 p.p.m. for cycle 3. Thus the detrimental effects of the accumulation of surface-active materials in the alkaline phase are clearly demonstrated in the decay of the activity of the catalyst.

In the second part of the test, a pretreatment procedure with pulverized solid caustic was employed. This consisted of pulverizing 40 grams of commercial caustic pellets in a commercial grinding mill until a finely divided, 50–10 mesh solid caustic was obtained. The pulverised solid caustic was then added to 2 liters of the kerosine and the resultant mixture allowed to stand for 2 hours. The kerosine was then decanted and filtered to remove entrained solid caustic. Thereafter, the solid caustic-free kerosine was contacted with 1 volume percent of a 0.5% by weight aqueous washing solution of a polyoxyethylene derivative of a fatty acid partial ester of a hexitol anhydride, which is marketed commercially under the trademark "Tween–60." After the washing, a black stable haze formed which quickly settled out. A treated kerosine was then recovered and found to contain 89 p.p.m. of mercapto sulfur and to have an acid number of 0.002. The kerosine was then employed in an identical 3 cycle sweetening procedure as that outlined above. At the end of each cycle the following values of residual mercapto sulfur content were recorded: 0.1 p.p.m. at the end of cycle 1, 8.0 p.p.m. at the end of cycle 2, and 16.0 p.p.m. at the end of cycle 3.

Since it is well known that for kerosines, the most difficult portion of the sweetening process attends the elimination of the last few p.p.m. of mercapto sulfur, it is evident from these results that the activity of the phthalocyanine catalyst is greatly improved. Furthermore, from the fact that over the 3 periods the residual mercapto sulfur level only changed 16 p.p.m., as contrasted with a 35 p.p.m. change for the control run over the 3 periods, it is clear that a significant increase in the stability of the catalyst has been effected.

EXAMPLE II

Using the same kerosine as described in Example I, a series of tests were made using the preferred solid bed form of catalyst system. In each of these tests 100 cc. of a fresh catalytic composite of activated carbon impregnated with cobalt phthalocyanine monosulfonate, was employed in a conversion zone. The catalyst was prepared by soaking 30–40 mesh activated carbon granules in a solution of cobalt phthalocyanine according to the procedure outlined in U.S. Patent No. 3,108,081.

In all tests, the catalyst was presoaked with an 8% by weight aqueous caustic solution in order to allow the carbon to adsorb the caustic. The conversion zone was maintained at a temperature of 70° F. and a pressure of 100 p.s.i.g. throughout the 20 hour duration of the tests. Moreover, the kerosine was charged to the conversion zone at a rate of 100 cc. per hour (i.e. a LHSV of about 1.0) and air was charged to the conversion zone at a rate of 190–200 cc. per hour (at standard conditions).

In the first test, the sour kerosine, containing 720 p.p.m. of mercapto sulfur, was charged to the conversion zone. The initial hydrocarbon effluent from the conversion zone was found to have a mercapto sulfur content of 18 p.p.m.

but the product after 2 liters had been processed was found to contain 51 p.p.m. of mercapto sulfur.

In a second test, the kerosine was pretreated by washing with 5 volume percent of a 20% by weight sodium hydroxide aqueous solution to result in a product having a mercapto sulfur content of 422 p.p.m. The pretreated kerosine was then charged to the conversion zone. The initial hydrocarbon effluent from the conversion zone contained 21 p.p.m. of mercapto sulfur; however, by the time 2 liters had been processed the residual mercapto sulfur content had risen to 33 p.p.m.

In the final test, the kerosine was pretreated according to the present invention in the identical manner reported in the second part of Example I. This pretreatment procedure resulted in a treated kerosine having 89 p.p.m. of mercapto sulfur. The treated kerosine was then charged to the conversion zone. The initial product had a mercapto sulfur content of 27 p.p.m. whereas that obtained at the 2 liter point had 29 p.p.m.

To recapitulate, the differences over the 20 hour period in the effluent mercapto sulfur content for the three tests were: (1) sour kerosine—33 p.p.m., (2) pretreatment with 5 volume percent of 20 weight percent caustic solution—11 p.p.m., and (3) pretreatment according to the present invention—2 p.p.m. Hence, the marked improvement in stability of the phthalocyanine catalyst produced by the combination process of the present invention is immediately evident.

I claim as my invention:

1. A process for treating a sour hydrocarbon distillate containing mercapto compounds and acidic, surface-active materials, said process comprising the steps of:

(a) contacting the sour hydrocarbon distillate with finely divided, solid alkali metal hydroxide to form salts of the acidic, surface-active materials;

(b) separating solid alkali metal hydroxide from the resulting mixture to obtain a hydrocarbon distillate containing alkali metal salts of the acidic, surface-active materials;

(c) washing the salt-containing distillate with an aqueous solution containing a water-soluble detergent to remove salts of the acidic, surface-active materials;

(d) contacting the washed distillate and an oxidizing agent with a phthalocyanine catalyst in an alkaline solution at conditions effecting oxidation of mercapto compounds, and (e) recovering from the products of said last contacting step, a treated hydrocarbon distillate substantially reduced in mercapto compound content.

2. The process of claim 1 further characterized in that said sour hydrocarbon distillate is a kerosine.

3. The process of claim 1 further characterized in that said sour hydrocarbon distillate is a gasoline.

4. The process of claim 1 further characterized in that said solid alkali metal hydroxide is sodium hydroxide.

5. The process of claim 1 further characterized in that said solid alkali metal hydroxide is potassium hydroxide.

6. The process of claim 1 further characterized in that said detergent is a salt of an alkyl aryl sulfonate.

7. The process of claim 1 further characterized in that said detergent is a polyoxyethylene derivative of a fatty acid partial ester of hexitol anhydride.

8. The process of claim 1 further characterized in that said oxidizing agent is oxygen.

9. The process of claim 1 further characterized in that said phthalocyanine catalyst comprises cobalt phthalocyanine sulfonate.

10. The process of claim 1 further characterized in that said phthalocyanine catalyst comprises cobalt phthalocyanine sulfonate composited with a carbon carrier material.

References Cited

UNITED STATES PATENTS

| | | | |
|---|---|---|---|
| 2,921,021 | 1/1960 | Urban et al. | 208—206 |
| 2,999,806 | 9/1961 | Thompson | 208—206 |
| 3,260,665 | 7/1966 | Urban | 208—207 |
| 3,371,031 | 2/1968 | Strong | 208—206 |

DELBERT E. GANTZ, *Primary Examiner.*

G. J. CRASANAKIS, *Assistant Examiner.*

U.S. Cl. X.R.

208—263, 286